United States Patent [19]

Kato et al.

[11] Patent Number: 5,447,671

[45] Date of Patent: Sep. 5, 1995

[54] WINDOW GLASS EDGING MEMBER FOR A VEHICLE SUCH AS AN AUTOMOBILE AND METHOD FOR MANUFACTURING THE EDGING MEMBER

[75] Inventors: Katsuhisa Kato, Moriya; Naohisa Miyakawa, Chiba; Minoru Masuzawa, Kashiwa, all of Japan

[73] Assignees: Tokiwa Chemical Industries & Co., Ltd.; Masuzawa Chemical Sales, Co., Ltd., both of Chiba; System Technical Co., Ltd., Ibaragi, all of Japan

[21] Appl. No.: 141,374

[22] Filed: Oct. 28, 1993

Related U.S. Application Data

[63] Continuation-in-part of Ser. No. 773,494, Oct. 9, 1991, abandoned.

[30] Foreign Application Priority Data

| Mar. 25, 1991 | [JP] | Japan | 3-041543 U |
| Feb. 24, 1991 | [JP] | Japan | 3-222546 |

[51] Int. Cl.⁶ .............................. B29C 47/06
[52] U.S. Cl. .................. 264/148; 156/244.24; 156/244.25; 264/122; 264/177.19; 264/300; 425/133.5
[58] Field of Search ........... 264/177.1, 177.17, 177.16, 264/177.19, 177.18, 177.20, 122, 171, 148–149, 300; 156/500, 244.25, 244.24; 425/133.5

[56] References Cited

U.S. PATENT DOCUMENTS

| 2,908,028 | 10/1959 | Runton et al. | 264/122 |
| 3,685,206 | 8/1972 | Kessler . | |
| 3,872,548 | 3/1975 | Bryant et al. | 24/73 HS |
| 3,897,967 | 8/1975 | Barenyl | 428/31 X |
| 3,918,206 | 11/1975 | Dochnahl | 49/441 |
| 3,927,493 | 12/1975 | Tsuneishi et al. | 428/31 X |
| 4,275,099 | 6/1981 | Dani | 293/128 X |
| 4,314,872 | 2/1982 | Schlesser | 156/500 |
| 4,351,868 | 9/1982 | Otani | 428/31 X |
| 4,360,549 | 11/1982 | Ozawa et al. | 428/31 |
| 4,442,156 | 4/1984 | Yamaguchi | 428/122 X |
| 4,643,923 | 2/1987 | Bernitz et al. | 428/31 |
| 4,668,543 | 5/1987 | Schlenz | 428/31 |
| 4,698,193 | 10/1987 | Bernitz et al. | 264/177.2 |
| 4,897,298 | 1/1990 | Otawa et al. | 428/122 |
| 4,923,759 | 5/1990 | Brooks et al. . | |
| 4,929,490 | 5/1990 | Iwasa | 428/31 X |
| 4,962,136 | 10/1990 | Peters | 523/220 |
| 4,969,293 | 11/1990 | Guillon . | |
| 4,996,011 | 2/1991 | Sano et al. | 264/122 |
| 5,005,317 | 4/1991 | Augustin et al. . | |
| 5,013,379 | 5/1991 | Brooks et al. | 428/122 X |
| 5,014,464 | 5/1991 | Dupuy et al. | 49/491 X |
| 5,042,201 | 8/1991 | Vaughn . | |
| 5,044,684 | 9/1991 | Yada | 428/31 X |
| 5,125,185 | 6/1992 | Shiota et al. . | |
| 5,136,773 | 8/1992 | Mesnel et al. | 49/490 X |
| 5,137,675 | 8/1992 | Rabe | 264/171 |
| 5,183,613 | 2/1993 | Edwards | 264/177.1 |
| 5,267,846 | 12/1993 | Miyama et al. | 264/171 |

FOREIGN PATENT DOCUMENTS

| 0209453 | 1/1987 | European Pat. Off. | 264/171 |
| 0372745 | 6/1990 | European Pat. Off. | 264/171 |
| 54-107963 | 8/1979 | Japan . | |
| 57-61543 | 4/1982 | Japan | 264/177.17 |
| 57-73024 | 5/1982 | Japan | 264/300 |
| 58-22148 | 2/1983 | Japan | 264/177.17 |
| 59-201838 | 11/1984 | Japan | 264/171 |
| 61-2085 | 1/1986 | Japan . | |
| 62-255217 | 11/1987 | Japan . | |
| 1-35740 | 7/1989 | Japan . | |
| 1-249513 | 10/1989 | Japan . | |
| 2-76716 | 3/1990 | Japan | 264/177.1 |
| 2220969 | 1/1990 | United Kingdom . | |

Primary Examiner—Jeffery R. Thurlow
Attorney, Agent, or Firm—Wenderoth, Lind & Ponack

[57] ABSTRACT

An edging member for a window glass of an automobile door is provided with a plurality of contacting surfaces against which window glass is contacted. Each contacting surface is provided with a rough contacting layer respectively including a synthetic resin prepared by mixing large and small particles or grains of materials having different melting points, such as nylon, urethane, fluoro-resin and polyolefin resin, polystyrene resin and the like. The rough contacting layer is extruded simultaneously with the extrusion molding of the edging member.

16 Claims, 5 Drawing Sheets

WINDOW GLASS EDGING MEMBER FOR A VEHICLE SUCH AS AN AUTOMOBILE AND METHOD FOR MANUFACTURING THE EDGING MEMBER

This application is a Continuation-In-Part of now abandoned application, Ser. No. 07/773,494, filed on Oct. 9, 1991.

BACKGROUND OF THE INVENTION

The present invention relates to a window glass edging material provided for a door of a vehicle such as an automobile or the like, which allows the window glass to be opened and closed (i.e. lowered and raised) in a light, smooth and stable manner, and which provides for proper draining. This invention also relates to a method for manufacturing the edging material.

A window glass for the door of a vehicle is usually opened and closed repeatedly for purposes of ventilation. Consequently, it should be possible to conduct the opening and closing operations for the window glass easily and so that a tight fit is maintained. Thus, there has recently been proposed and generally employed a window glass edging material comprising a guide edging member and a press edging member, and which is molded generally from a flexible component such as a flexible synthetic resin or the like to provide for light (or easy) opening and closing of the window glass. The guide edging member which has been used has had a material having either nylon fiber or the like fixed opposing edges of the supporting tongues of the guide edging member which touch the upper edge of the window glass, or a fluoro-synthetic resin tape containing molybdenum fixed by an adhesive at a place where the guide edging member presses against the upper edge of the window glass.

The press edging member, on the other hand, has been used with the above-mentioned material having nylon fibers or fluoro-synthetic resin provided on opposing upper and lower contacting pieces slidably press against opposing sides of the window glass.

However, while these guiding edging members and drain edging members have allowed the window glass to make satisfactory engagement therewith and disengagement therefrom for a smoother opening and closing operation thereof, a very complex process is required for implanting the fibers and a very troublesome process is required for applying an adhesive to the fiber portion, such that the overall process is rather impractical. Moreover, repeated opening and closing of the window glass and penetration of rainwater and the like make the implanted fibers bend down and/or wear to such an extent that they are no longer as effective as expected.

Particularly in this connection, in order to make use of the synthetic resin tape for the edge guiding material, there are numerous troublesome procedures necessary in adhesively fixing the synthetic resin tape onto the pressure tongues as well as into a very complex inside portion into which the upper edge of the window glass is inserted. Furthermore, the synthetic resin tape usually cannot be bonded on complex curved portions or cornered surfaces, i.e. other than a planar surface, such as opposed edge supporting tongues as referred to above, and the like. This is a drawback fatal to the process.

The guide edging member and press edging member each comprise a flexible component such as a flexible synthetic resin, synthetic rubber, or the like arranged to press against opposing sides of the glass window as the window slides therebetween. While the press edging pressing member is remarkably waterproof because the member is closely pressed toward each side of the glass, this makes the opening and closing operation of the window glass heavy and difficult because of the strong pressing force and may eventually cause the window handle portion to become broken and make the draining ineffective. These are among the major defects of the prior art.

SUMMARY OF THE INVENTION

The object of the present invention is, therefore, to provide a guide edging member and a press edging member which enable a light opening and closing operation of the window glass without any load, a satisfactory and close engagement of the window with and a satisfactory disengagement of the window glass from the guide edging and press edging members over a long period of time, and a method of easily manufacturing these edging members.

According to the present invention, an edging material provided in a door panel receiving a window glass of a vehicle such as an automobile is provided with a plurality of contacting surfaces against which the window glass is contacted, and each of the contacting surfaces is provided with a rough contacting layer respectively comprising a synthetic resin prepared by mixing large and small particles or grains of materials having different melting points, such as nylon, urethane, fluoro-resin and polyolefin resin, polystyrene resin, etc. and is extruded simultaneously with the extrusion molding of the edging member.

According to the present invention, a guide edging member provided in a door panel receiving a window glass of a vehicle such as an automobile is formed by longitudinally extruding a flexible synthetic resin, and is provided with a groove portion into which an edge of the window glass is inserted and which is formed in the guide edging member, two supporting tongues on opposing sides of the opening of the groove portion, and a batten surface disposed on each of the surfaces of the supporting tongues and on an inside portion of the groove portion which is pressed against the window glass when the window glass is closed. The batten surfaces are comprised of a synthetic resin prepared by mixing large and small particles or grains of materials having different melting points and low coefficients of friction, such as nylon, urethane and polyolefin resin, polystyrene resin, etc., and is extruded simultaneously with the guide edging member.

In the present invention, a drain edging member is formed by longitudinally extruding a flexible synthetic resin and is provided with two supporting strip bodies on opposing sides of the window glass which form the drain edging member. Upper and lower pressing pieces are provided respectively on the upper and lower portions of each of the two supporting strip bodies, and contacting surfaces are provided on the upper and lower pressing pieces. Rough contacting layers are provided on the contacting surfaces and have many projections and recesses formed thereon. The rough contacting layers are extruded simultaneously with the supporting strip bodies and are comprised of synthetic resin prepared by mixing large and small sized particles or grains of materials having different melting points, compatibility, and a low coefficient of friction, such as nylon, urethane, fluoro-resin and polyolefin resin, etc.

DETAILED DESCRIPTION OF THE PREFERRED EMBODIMENTS

The present invention will now be described in detail with reference to the accompanying drawings and, more particularly, to FIGS. 1 to 6 illustrating an embodiment of a guide edging member of the window glass edging material of a vehicle such as an automobile, according to the present invention. A guide edging member 1 is molded in the form of a longitudinal belt from a component comprising a resilient and flexible synthetic resin or synthetic rubber or the like, and is engaged with a receiving frame 14 of a door panel 12 so as to permit a window glass 15, 15 of each of doors 13, 13 provided on a vehicle 19 to be raised for closing and lowered for opening with much less sliding resistance at the upper edge thereof. The guide edging member 1 has a generally square cross-section and is provided with a groove portion 2 into which the upper edge of the window glass 15 is inserted. Supporting tongues 3, 4 are respectively formed on opposing sides of the inlet opening of the groove portion 2. An inner bottom face 5 of the groove portion 2, against which the upper edge of the window glass 15 is pressed, an inner side wall 6, and the supporting tongues 3, 4, against which side surfaces of the window glass 15 are pressed, are respectively provided with batten surfaces (or contacting layers) 10 made of a synthetic resin 7 such as nylon, urethane and polyolefin resin, polystyrene resin or the like. The synthetic resin 7 is prepared by mixing various sized particles or grains 8 of synthetic resins having different melting points. The batten surfaces 10, 10 are formed by extrusion molding together with the guide edging member when the guide edging member is extruded. The batten surfaces 10, 10 are provided with rough surfaces 9 because the different melting points of the particles or grains 8 result in there being both melted portions and unmelted portions. This permits the window glass 15, 15 to be opened and closed with much less sliding resistance.

Figure 1:
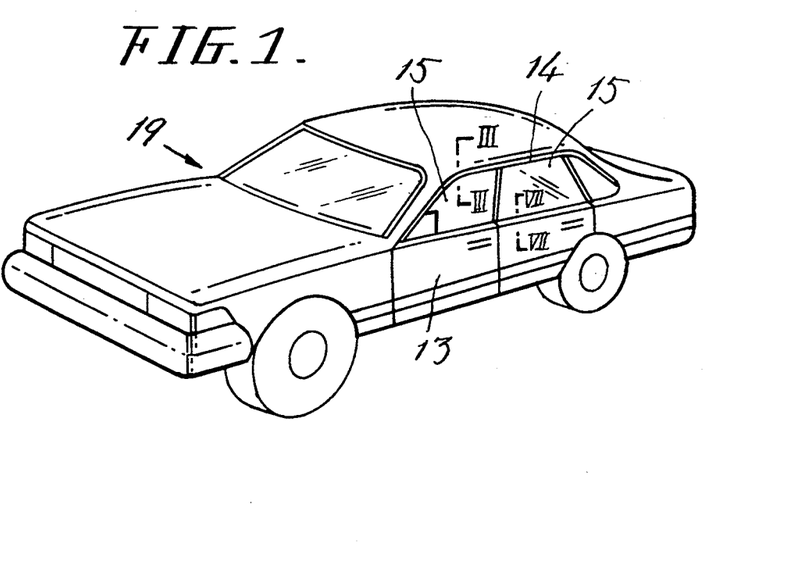
FIG. 1 is a perspective view of an automobile having edging members according to the present invention.
Figure 2:
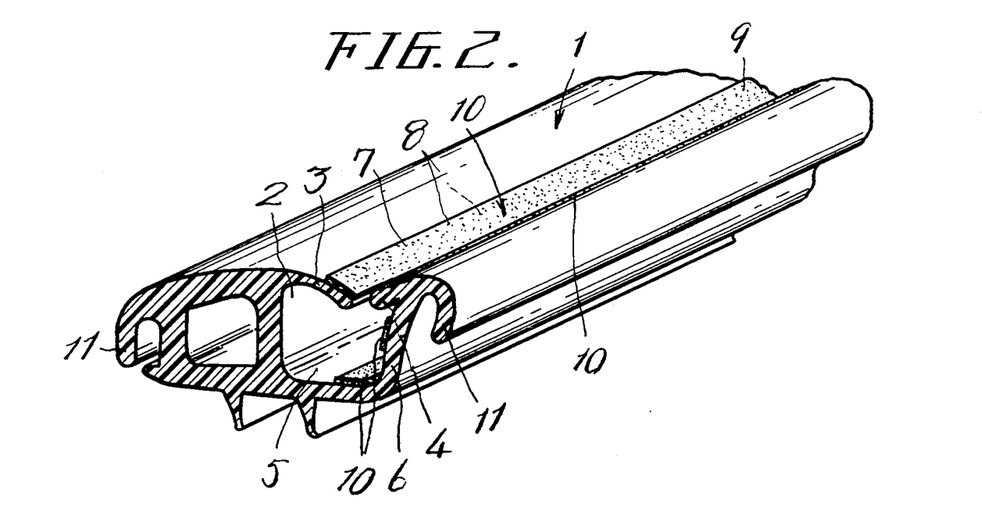
FIG. 2 is a perspective view of a guide edging member according to the present invention.
Figure 3:
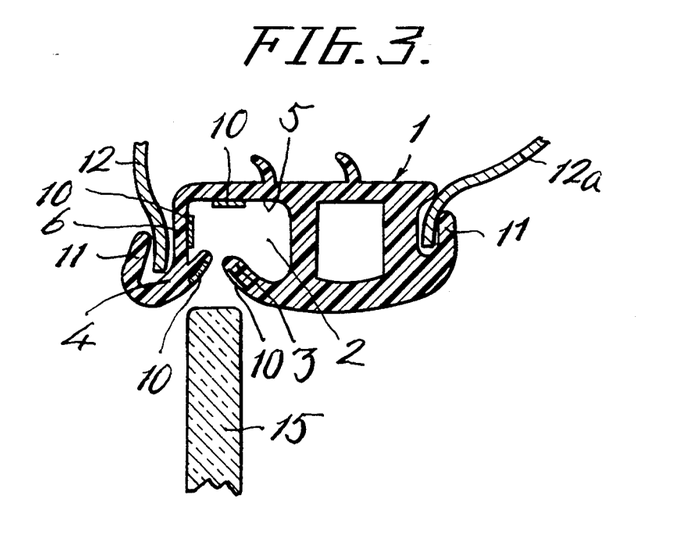
FIG. 3 is an enlarged sectional view of the guide edging member taken along line III—III of FIG. 1 showing a window glass in its open condition.
Figures 4, 5:
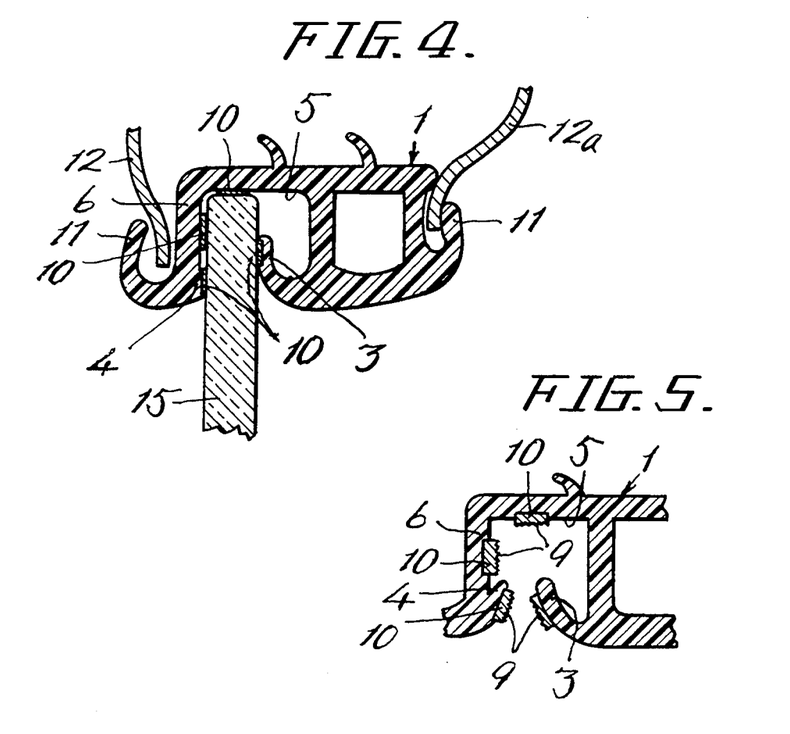
FIG. 4 is an enlarged sectional view of the guide edging member taken along line III—III of FIG. 1 showing the window glass in its closed condition.
FIG. 5 is a partially cut-away sectional view of the guide edging member of the present invention.

The batten surfaces (or contacting layers) 10, formed of the synthetic resin materials having different melting points consisting of nylon, urethane and polyolefin resin, polystyrene resin and the like, are such that they create less frictional resistance. The batten surfaces 10 can be extruded monolithically with the guide edging member 1, using, for example, small and large sized synthetic resin particles or grains with low melting points, such as nylon 12, nylon 11 and polyolefin resin, mixed with large and small sized particles or grains of synthetic resins with high melting points, such as nylon 6, nylon 66 and fluoro-plastics, polyolefin resin, polystyrene resin and the like, so as to form the rough surface 9 caused by the different degrees of melting of the particles or grains 8 at the batten surface 10. In this manner, the guide edging member 1 is formed to allow swift opening and closing operations of the window glass 15. Further, the guide edging member 1 is provided with curved fastening pieces 11 at the longitudinal sides of the guide edging member 1 which hold therebetween the edges of the door panel 12, 12a.

Figure 6:
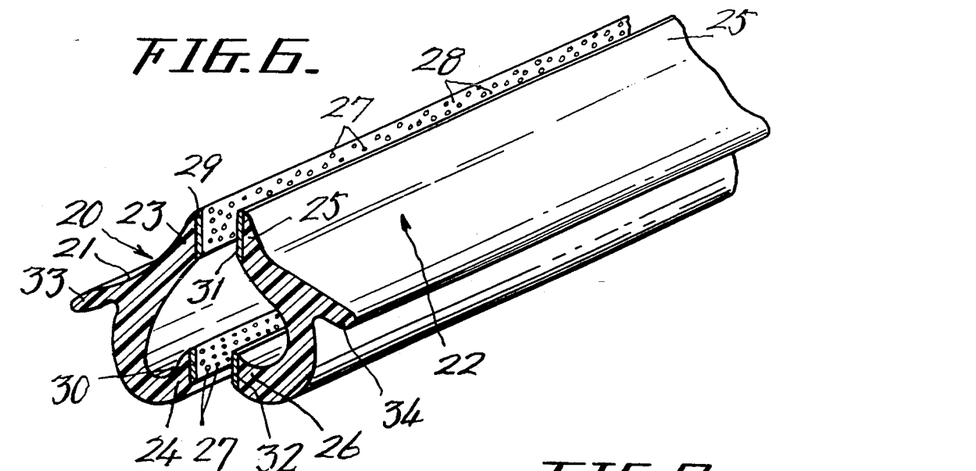
FIG. 6 is a perspective view of a press edging member according to the present invention.
Figure 7:
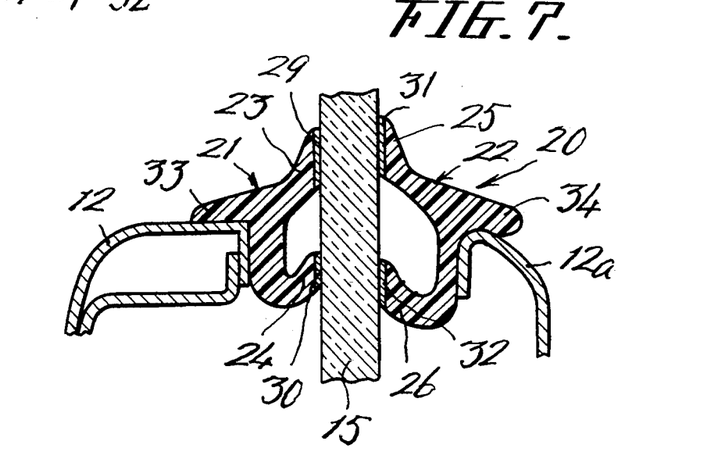
FIG. 7 is an enlarged sectional view of the press edging member taken along line VII—VII of FIG. 1.
Figure 8:
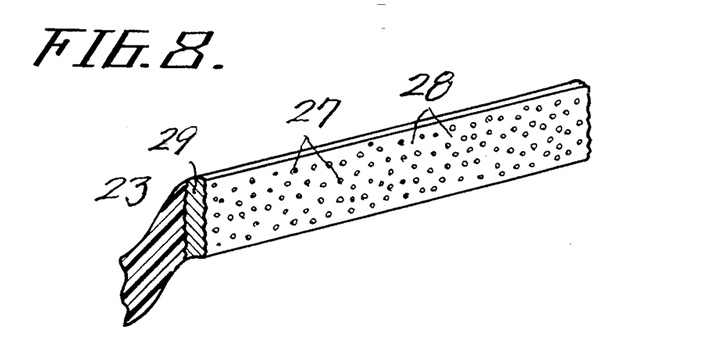
FIG. 8 is a perspective view of a strip body attached to the press edging member for pressing against a window glass.

Referring to FIGS. 6 to 8, reference numeral 20 denotes a drain edging member 20 which contacts and presses against opposing sides of the window glass 15 which ascends and descends in the opening of the door 13, 13 of the vehicle 19, and for guiding the window glass. The drain edging member 20 is formed by longitudinally extruding a component of flexible synthetic resin or the like in a manner similar to the guide edging member 1. The drain edging member 20 comprises supporting strip bodies 21 and 22 disposed on opposing sides of the window glass 15. The supporting strip body 21 is provided with an upper pressing piece 23 and a lower pressing piece 24, and the supporting strip body 22 is likewise provided with an upper pressing piece 25 and a lower pressing piece 26.

Each surface of the upper pressing pieces 23, 25 and the lower pressing pieces 24, 26 which contacts the window glass 15 is provided with a rough surface layer 29, 31 and 30, 32, respectively. Each rough surface layer 29, 31 and 30, 32 has many projections 27 and recesses 28 formed so as to reduce frictional resistance by suitably mixing large and small sized synthetic resin particles or grains having different melting points, such as nylon, urethane, fluoro-resins and polyolefin resins, polystyrene resins or the like. These rough surface layers 29–32 are extruded monolithically with the supporting strip bodies 21, 22, respectively. In this connection, the low melting point material used for the rough surface layers of the drain edging member 20 can be nylon 12, nylon 11 and polyolefin resin and polystyrene resin, and the high melting temperature materials can be nylon 6, nylon 66, and flouro-resin and polyolefin resin, polystyrene resin.

Further, the supporting strip bodies 21, 22 are provided at approximately vertical center portions thereof with collar portion 33, 34, respectively, to be fitted to both sides of the door panel 12, 12a, respectively.

As described above, the guide edging member 1 is formed by longitudinally extruding a thermoplastic flexible synthetic resin in an extrusion molding machine. The batten surfaces 10 on the supporting tongues 3, 4 and the batten surface 10 provided in the inside of the groove portion 2, include the synthetic resin material 7 which is a mixture of large and small sized synthetic resin particles and grains including a lower melting point synthetic resin (e.g. nylon 12 or nylon 11 and polyolefin resin, polystyrene resin) and a higher melting point synthetic resin (e.g., nylon 6 or nylon 66 and fluoro-resin, polyolefin resin, polystyrene resin and the like), and are extruded simultaneously and monolithically in the extrusion molding of the guide edging member 1. In this manner, a rough and uneven surface portion caused by different degrees of melting of the particles and grains having different melting points is formed.

The supporting strip bodies 21, 22 of the drain edging member 20 are secured by means of an adhesive or the like to the door panel 12, 12a, respectively, on opposite sides of the opening in the door 13 through which the window glass 15 extends. When the window glass 15 is raised or lowered, the coefficient of friction between the drain edging member and the window glass is reduced due to the uneven surface created by the projections 27 and recesses 28 on each of the rough surface layers 29, 30 and 31, 32. Therefore, the drain edging member can be used steadily for a long period of time, because of the ease with which it allows the window glass to be raised and lowered, and the suitable contact between the glass and the rough surface layers.

As described above, the guide edging member and the drain edging member according to the present invention allow the window glass of the door to be raised and lowered easily and reliably with much less sliding resistance, as well as without wear of materials, thereby enabling a prolonged period of use. Further, because of the suitable contact of the guide edging member and the drain edging member with the window glass, complete protection from rainwater penetration and an effective draining of rainwater are provided. The guide edging member also advantageously has the synthetic resin material bonded to the supporting tongues in such a manner as to overcome the difficulty in the prior art in bonding on a curved surface. Further, in the drain edging member, the supporting strip bodies are opposed to each other and are provided respectively with the upper and lower pressing pieces at the upper and lower portions thereof, respectively, to cushion the contact with the window glass and completely absorb vibrations of the window glass to reduce noise therefrom. In addition, there are other advantageous effects. For example, uneven surface portions are formed on contacting surfaces, including the supporting tongues on opposing sides of the opening of the groove portion, the inside walls of the groove portion, and the surfaces of the upper and lower contacting pieces, by mixing large and small sized particles or grains of synthetic resins such as nylon, urethane, fluoro-resin and polyolefin resin, polystyrene resin and the like, so that the contacting surfaces are subject to less sliding resistance. Another advantageous effect is that an even rough surface can be formed on the contacting portions, as the synthetic resin materials of different melting points can be suitably melted during monolithical extrusion. Further advantageous effects can be had by selecting suitable materials to provide the desired sizes of the projections and recesses to be formed on the surfaces. Such excellent effects can be provided for any contacting surface of such an edge guiding member even if it has a curved, cornered, or the like sectional shape.

WORKING EXAMPLE

Figure 9:
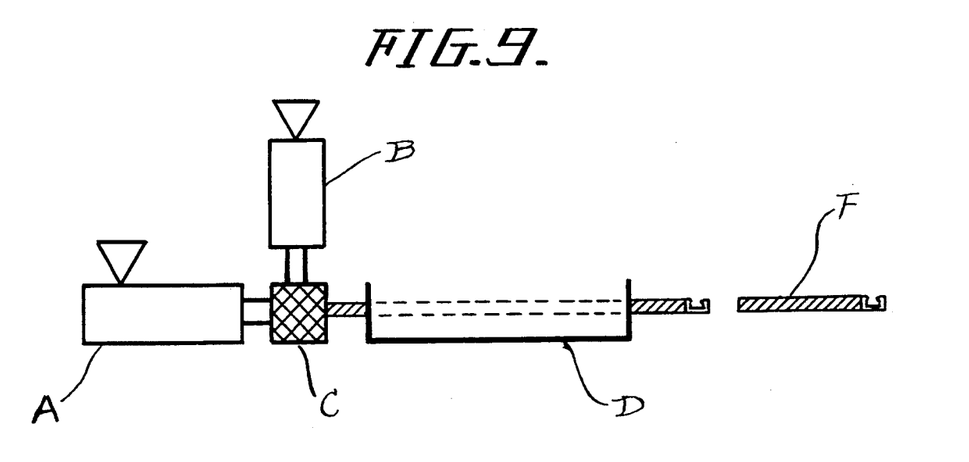
FIG. 9 schematically shows an extruding system used in forming the guide edging member of the present invention.

A flexible synthetic resin comprising a thermoplastic elastomer (Shore A hardness 80) of for forming an edging substrate was inserted into a first extruding machine (A) and heated to the temperature of 190° C., while a mixture, for forming a contacting layer, of two materials with different melting points was inserted into a second extruding machine (B) and heated to the temperature of 220° C. The two materials inserted into the extruding machine (B) included a high molecular weight polyolefin resin (in particular, a high molecular weight polyethylene resin) with a low melting point, and an ultra high molecular weight polyolefin resin (in particular, an ultra high molecular weight polyethylene resin) with a high melting point and in the form of particles or grains with sizes of 0.005 mm to 0.15 mm. The material for forming the edging substrate and the material for forming the contacting layer were extruded simultaneously by operating the two extruding machines (A) and (B) and were cohered within a die (C) heated to the temperature of 190° C. to form the contacting layer with a thickness of 0.04 mm on the edging substrate. The particles or grains of ultra high molecular weight polyethylene in the extruding machine (B) did not melt at the extruding temperature and pressure due to their higher melting point, and they thus formed a rough surface having projections on the surface of the contacting layer. The extruded products were then passed through a cooling tank (D) and cut into the desired sizes by a cutter (not shown) as unitary finished goods (F).

Table 1 (below) shows the results of test extrusions performed with different ratios of the mixture for forming the contacting layer, to allow examination of the extruded products.

TABLE 1

|  | sample 1 | sample 2 | sample 3 | sample 4 | sample 5 |
|---|---|---|---|---|---|
| Amount of high, molecular weight polyethylene resin (molecular weight 300,000) | 100% | 90% | 80% | 70% | 50% |
| Amount of ultra high molecular weight polyethylene resin (molecular weight 1,300,000) | 0% | 10% | 20% | 30% | 50% |
| Shore A hardness | 65 | 65 | 65 | 65 | 65 |
| result of extrusion of contacting layer (with rough surface) | A | 0 | 0 | 0 | X |
| coefficient of kinetic friction to glass | 0.5 | 0.25 | 0.19 | 0.16 | — |
| abrasiveness of contacting layer to glass (10,000 times) | U | A | A | A | — |

0 = contacting layer extruded with 0.04 mm thickness and with rough surface.
A = contacting layer extruded with 0.04 mm thickness, but without rough surface.
X = contacting layer not extruded at 0.04 mm thickness.
— = could not be determined (contacting layer could not be extruded).
U = Unacceptable (wore away during test)
A = Acceptable As shown in Table 1, it was possible to extrude a 0.04 mm thick contacting layer using 100% of the low melting point high molecular weight polyethylene resin and 0% of the high melting point ultra high molecular weight polyethylene resin (sample 1), but the contacting layer was not formed with a rough surface having projections. Thus, when tested in use by employing it in 10,000 repetitions of window glass opening and closing, the contacting layer of sample 1 was worn away.

For samples 2, 3 and 4 respectively having 10%, 20% and 30% of the high melting point resin, it was possible to extrude a 0.04 mm thick contacting layer having a rough surface with projections. Also, each of samples 2, 3 and 4 performed favorably when subjected to the 10,000 repetitions of window glass opening and closing, in that abrasion was low and the contacting layers were not unduly worn away.

For sample 5, having 50% of the high melting point resin and 50% of the low melting point resin, it was impossible to extrude a contacting layer with a thickness of 0.04 mm.

Thus, the contacting layer is properly formed according to the present invention when the proportion of the high melting point resin is 10% to 30% and possibly 5% to 40%, and the proportion of the low melting point resin is 70% to 90% and possibly 60% to 95%.

Figure 10:
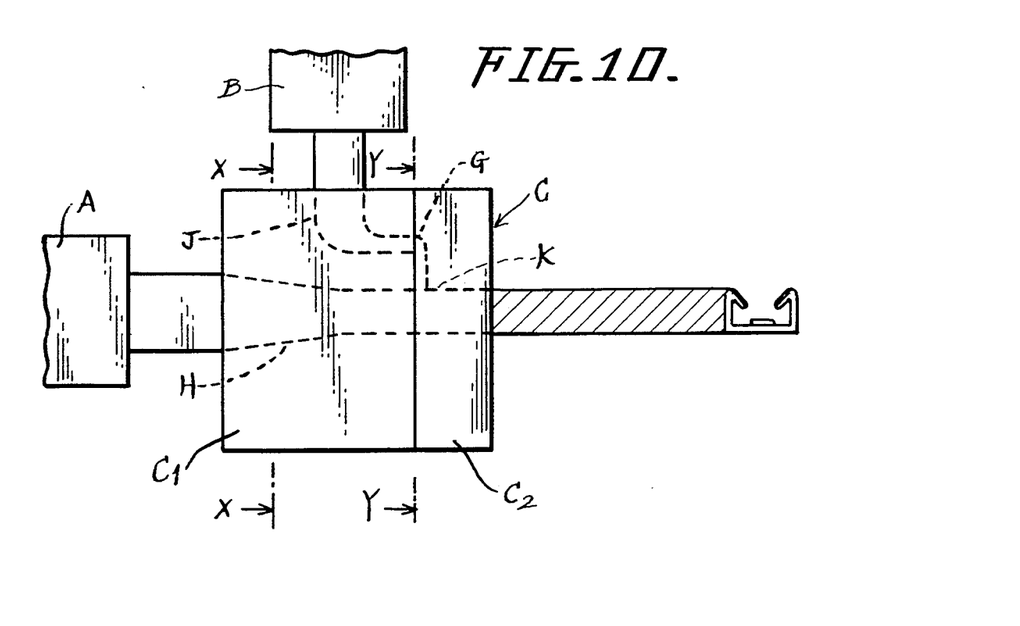
FIG. 10 is an enlarged view of a die shown in FIG. 9.
Figure 11:
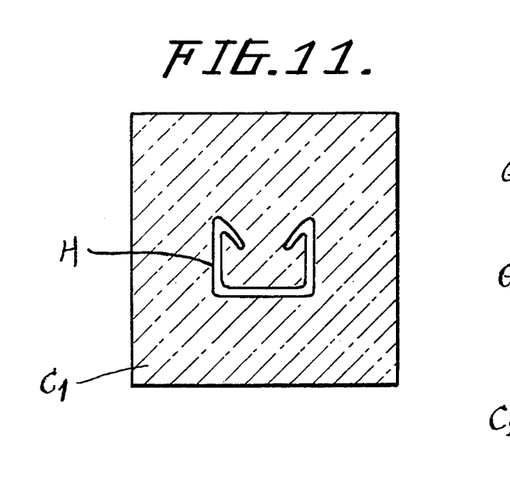
FIG. 11 is a cross-sectional view, taken along line X—X in FIG. 10, of one die member of the die of FIG. 10.
Figure 12:
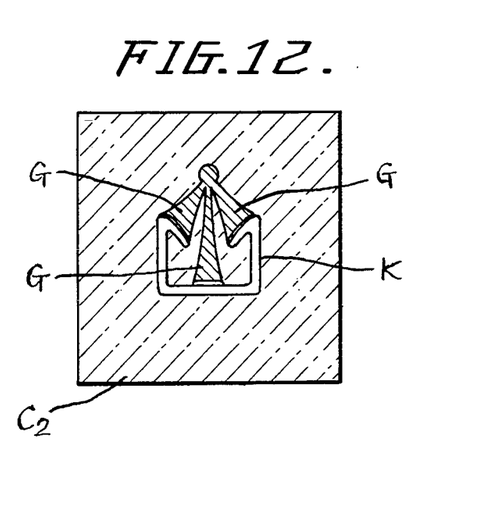
FIG. 12 is a cross-sectional view taken along line Y—Y in FIG. 10, of a second die member of the die of FIG. 10.

The die C, shown in FIG. 9, will now be described in more detail with reference to FIGS. 10–12. Specifically, the die C comprises two die members $C_1$ and $C_2$ which are combined with each other, and the two dies $C_1$ and $C_2$ are heated to the temperature of 190° C., respectively.

As the die $C_1$ is provided with a guide slot H in the shape of the edging substrate, the material for the edging substrate inserted in the extruding machine A is guided in the shape of the edging substrate through the die $C_1$. The die $C_1$ is also provided with a flow slot J for feeding of the contacting layer resin mixture to guide channels G formed in the die $C_2$. The die $C_2$ is provided with an extruding slot K in the shape of the edging substrate having the contacting layer, to which the guide slot H formed in the die $C_1$ and the guide channels G are connected respectively. The resin mixture for the contacting layer is guided from the extruding machine B to the guide channels G formed in the die $C_2$ through the flow slot J formed in the die $C_1$. In the die $C_2$, the resin mixture for the contacting layer and the material for the edging substrate are extruded and are polymerized in the extruding slot K formed in the die $C_2$.

What is claimed is:

1. A method of manufacturing an edging member for a window glass of an automobile door, comprising:
   forming an edging substrate from a thermoplastic flexible synthetic resin material;
   forming at least one contacting layer by mixing first synthetic resin particles or grains having a first melting point with second synthetic resin particles or grains having a second melting point higher than said first melting point, and heating the mixture of first and second synthetic resin particles or grains in such a manner that said first synthetic resin particles or grains are melted but said second synthetic resin particles or grains are not fully melted, to thereby provide said contacting layer with a rough contacting surface of projections and recesses formed by the presence of the not fully melted second synthetic resin particles or grains, said first synthetic resin particles or grains constituting 70 to 90 percent, inclusive, of said mixture, and said second synthetic resin particles or grains constituting 10 to 30 percent, inclusive, of said mixture; and
   extruding said at least one contacting layer simultaneously and monolithically with said edging substrate to form an edging member having said rough contacting surface adapted to contact the window glass of the automobile door.

2. A method as recited in claim 1, wherein
   said step of forming said at least one contacting layer comprises forming a plurality of contacting layers having rough contacting surfaces; and
   said step of extruding comprises extruding said plurality of contacting layers simultaneously and monolithically with said edging substrate to form the edging member with said plurality of rough contacting surfaces adapted to contact the window glass of the automobile door.

3. A method as recited in claim 2, wherein
   said edging member formed includes opposing pressing members adapted to contact opposing sides of the window glass and having thereon said contacting layers with said rough contacting surfaces adapted to press against the window glass.

4. A method as recited in claim 1, wherein
   said first synthetic resin particles or grains and said second synthetic resin particles or grains are selected from the group consisting of nylon, urethane, polyolefin, and polystyrene.

5. A method as recited in claim 4, wherein
   said first synthetic resin particles or grains are selected from the group consisting of nylon 11, nylon 12, and polyolefin resin; and
   said second synthetic resin particles or grains are selected from the group consisting of nylon 6, nylon 66, flouro-resin, polyolefin resin, and polystyrene resin.

6. A method of manufacturing an edging member for a window glass of an automobile door, comprising:
   charging a thermoplastic flexible synthetic resin into a first extruding machine;
   charging, into a second extruding machine, a mixture of first synthetic resin particles or grains having a first melting point and second synthetic resin particles or grains having a second melting point higher than said first melting point and which will not fully melt if heated to a temperature at or above said first melting point but below said second melting point, said first synthetic resin particles or grains constituting 70 to 90 percent, inclusive, of said mixture, and said second synthetic resin particles or grains constituting 10 to 30 percent, inclusive, of said mixture;
   providing a die having a first channel with a first cross-sectional shape corresponding to a cross-sectional shape of an edging member substrate, and a second channel downstream of and contiguous with said first channel and having a cross-sectional shape corresponding to a cross-sectional shape of said edging member substrate with at least one contacting layer fixed thereon;
   heating said die to a temperature at or above said first melting point but below said second melting point;
   extruding said flexible synthetic resin from said first extruding machine and through said first and second channels; and
   extruding said mixture, simultaneous with extrusion of said flexible synthetic resin, from said second extruding machine and into and through said second channel, such that the at least one contacting layer, formed from said mixture and having a rough contacting surface of projections and recesses caused by the presence of said second synthetic resin particles or grains, is monolithically united with said edging member substrate while being forced through said second channel of said die, heated to said temperature at or above said first melting point but below said second melting point, so as to form said edging member.

7. A method as recited in claim 6, wherein said at least one contacting layer comprises a plurality of contacting layers.

8. A method as recited in claim 6, wherein said edging member formed includes opposing pressing members adapted to contact opposing sides of the window glass and having thereon said contacting layers with rough contacting surfaces adapted to press against the window glass.

9. A method as recited in claim 6, further comprising passing said edging member through a cooling tank.

10. A method as recited in claim 9, further comprising after said edging member has been passed through said cooling tank, cutting said edging member to a desired length.

11. A method as recited in claim 6, wherein said first synthetic resin particles or grains and said second synthetic resin particles or grains are selected from the group consisting of nylon, urethane, polyolefin, and polystyrene.

12. A method as recited in claim 11, wherein said first synthetic resin particles or grains are selected from the group consisting of nylon 11, nylon 12, and polyolefin resin; and
said second synthetic resin particles or grains are selected from the group consisting of nylon 6, nylon 66, flouro-resin, polyolefin resin, and polystyrene resin.

13. A method as recited in claim 6, wherein said first synthetic resin particles or grains comprise high molecular weight polyethylene; and
said second synthetic resin particles or grains comprise ultra high molecular weight polyethylene.

14. A method as recited in claim 13, wherein 10% to 30% of said mixture is said ultra high molecular weight polyethylene.

15. A method as recited in claim 6, wherein said die provided includes a first die member having said first channel therein, and a second die member having said second channel therein.

16. A method as recited in claim 14, wherein said second die member further has a flow channel formed therein which communicates with said second extruding machine and said second channel and allows said mixture to be fed from said second extruding machine to said second channel.

* * * * *